United States Patent [19]

Hinton et al.

[11] Patent Number: 4,603,963
[45] Date of Patent: Aug. 5, 1986

[54] OPTICAL SCANNING CARRIAGE

[75] Inventors: John H. Hinton, Ontario; William T. Foti, Caledonia; Philip J. Giguere, Rochester, all of N.Y.

[73] Assignee: Xerox Corporation, Stamford, Conn.

[21] Appl. No.: 660,766

[22] Filed: Oct. 15, 1984

[51] Int. Cl.$^4$ .............................................. G03G 15/04
[52] U.S. Cl. ...................................................... 355/8
[58] Field of Search .................... 355/8, 11, 57, 60, 66; 198/690

[56] References Cited

U.S. PATENT DOCUMENTS 4,355,883 10/1982 Landa ...................................... 355/8

FOREIGN PATENT DOCUMENTS 55-12143  9/1980 Japan.
58-78141  5/1983 Japan ...................................... 355/8

Primary Examiner—Arthur T. Grimley
Assistant Examiner—J. Pendegrass

[57] ABSTRACT

An optical scanning carriage is arranged to be moved along guide rails placed in a plane beneath, and parallel to an object plane. Magnets are incorporated into the carriage base to provide an attractive force between the carriage and the guide rails. This attractive force is designed to balance and neutralize forces associated with high scan rates which would tend to lift the carriage from its sliding contact along the guide rails.

1 Claim, 3 Drawing Figures

OPTICAL SCANNING CARRIAGE

This invention relates to an optical scanning device for a document reproduction machine and, more particularly, to an improved reciprocal carriage for supporting optical components during a scanning operation.

In the photoreproduction art, it has been found advantageous to support the original to be reproduced upon a stationary viewing platen while recording an image of the original upon a photosensitive plate. Copies of the original can then be conveniently reproduced from the plate. It has also been desirable to provide means for compacting a copying device while still maintaining a high fidelity reproduction of the original. In these devices, the optical system used to scan the original must be vertically compressed in order to achieve the required compact dimensions. An exemplary example of such a system is disclosed in U.S. Pat. No. 3,832,057. In the optical scanning arrangement disclosed thereon, a stationary viewing platen is arranged to support an original to be copied within a substantially horizontal plane. Scanning optical elements on a carriage are swept horizontally across the platen from one margin thereof to the opposite margin at a constant velocity to scan successive incremental areas of the original. Additional optical elements are disclosed to maintain conjugate length between the object plane of the system and a projection lens.

While systems of the type disclosed above can produce satisfactory copy quality at relatively slow copy speeds, attempts to increase copy speed above a certain point (approximately 26 cpm) result in lead edge "skips" on the copy paper. Because of the location of the various components, the carriage mass is unequally distributed, and excessive changes of speed of the carriage, i.e. carriage deceleration from an end of scan followed by rapid acceleration at a start of scan position; create an inertial moment (torque) acting on the carriage. This force tends to cause the end of the carriage in the scan direction to lift away from the guide rails to side as the scanning cycle begins. This results in blurring of the lead edge of the document being scanned and loss of the interdocument erase function.

It is therefore one object of the present invention to maintain faithful reproduction of an original document in a compact copier operating at relatively high copying speed.

According to the present invention, a copying device having a stationary platen for supporting documents is scanned at a high scanning rate by a scanning carriage reciprocated in the horizontal plane lying beneath the platen. The carriage cooperates with magnetic means to maintain intimate contact with a pair of guide rails. More particularly, the invention relates to an optical scanning system in which an original document on a transparent document plane is incrementally scanned by a plurality of movable optical components located beneath said plane and a flowing light image of said document is projected upon an image plane, the system comprising:

an improved scanning carrier having at least one of said optical components mounted thereon, said carrier movable along at least one ferrous-containing guide member positioned in a plane parallel to said document plane, and magnetic means adapted to create an attractive magnetic field between said carrier and said guide member, whereby said attractive magnetic field maintains a uniform sliding contact between said carrier and said guide member during said scan motion.

DRAWINGS

DESCRIPTION OF PREFERRED EMBODIMENT

The invention will now be described by reference to a preferred embodiment of the optical scanning carriage and deceleration device.

Figure 1:
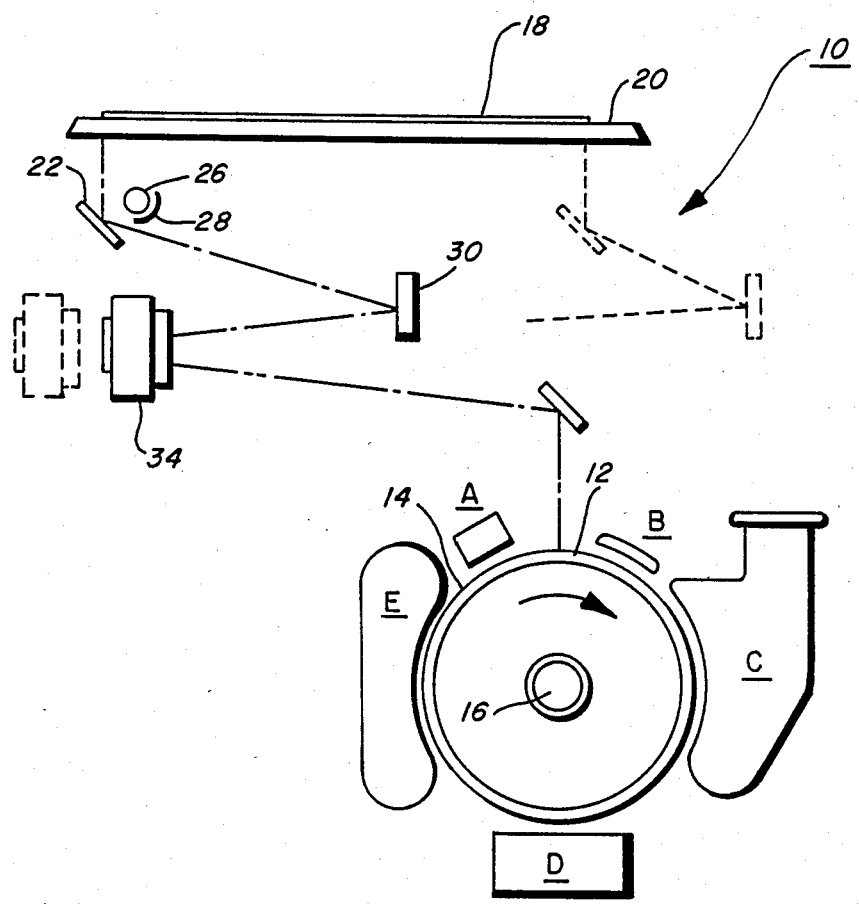
FIG. 1 represents a side schematic view of a document reproduction system utilizing the improved scan carriage of the present invention.

Referring now to FIG. 1, there is shown by way of example an automatic xerographic reproduction machine 10 which includes the optical scanning carriage of the present invention. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in the application to the particular embodiment of embodiments shown herein.

Figure 2:
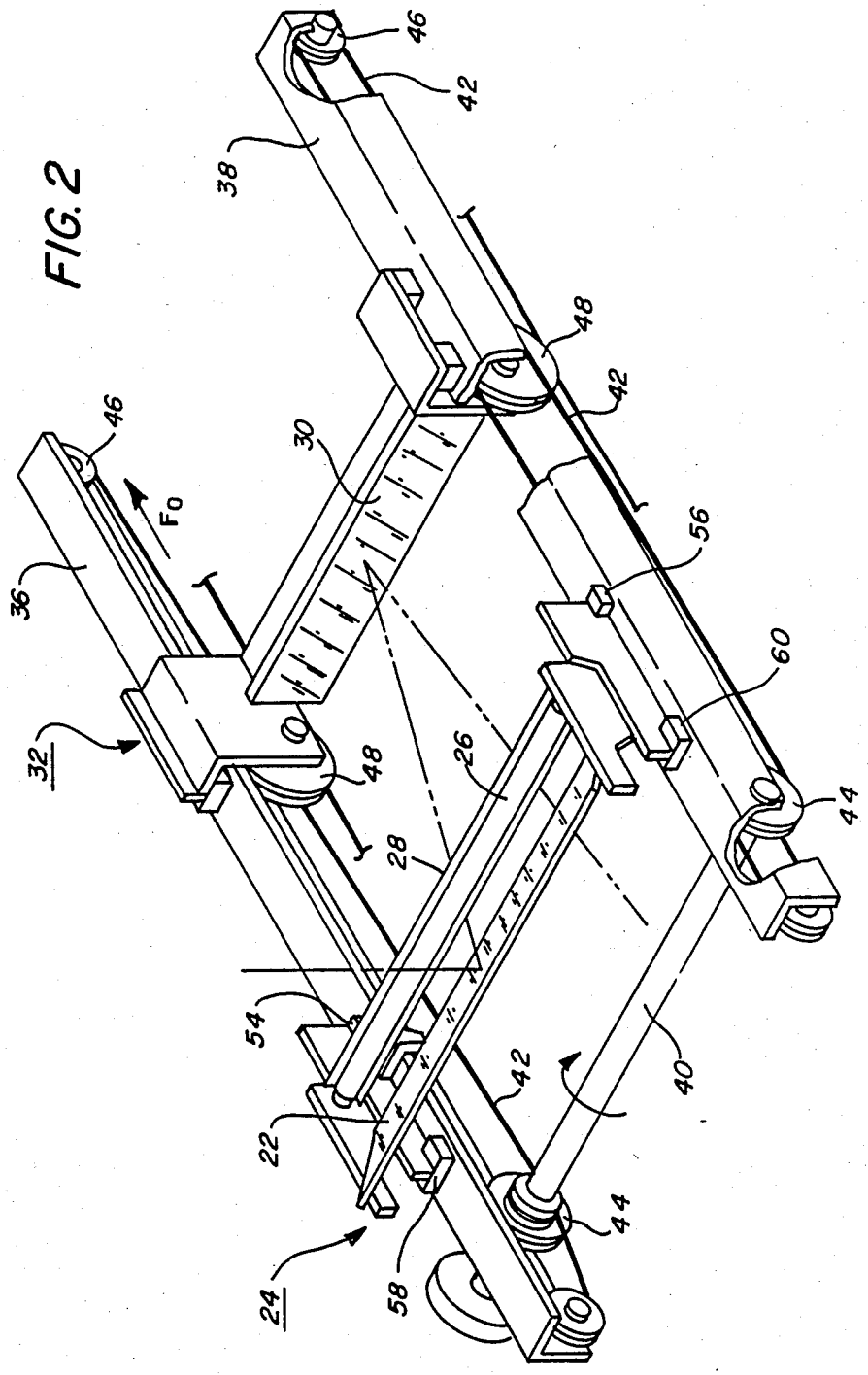
FIG. 2 is a top perspective view of the optical scanning mechanism showing the location of the magnetic members.

This system shown in FIGS. 1 and 2 of the present application produces a 1 to 1 reproduction of an original utilizing two scanning carriages traveling at different rates of speed in order to maintain the required total conjugate length. As shown in FIG. 1, image recording drum 12 has an outer surface upon which is coated a suitable photoconductive material 14. The drum, which is journaled for rotation with the machine frame by means of a shaft 16, rotates in the direction indicated to bring the photoconductive image recording surface thereon past a plurality of xerographic processing stations. Although not shown, it should be understood that suitable drive means are provided to both power and coordinate the movement of the various machine components whereby a faithful rendition of the original input scene information is produced.

Since the practice of xerography is well known in the art, the various processing stations for producing a copy of an original are herein represented in FIG. 1 as blocks A-E. At station A, an electrostatic charge is placed uniformly over the surface of the moving photoconductive drum surface preparatory to receiving the light image of an original to be reproduced. The charged drum surface is then moved through an exposure station B, where a flowing light image of the original is recorded on the plate in a manner to be described in greater detail below. As a result of this imaging operation the charge of a drum surface is selectively dissipated in the light exposed region, thereby recording the original input scene information on the photoconductive plate surface in the form of a latent electrostatic image. Next, in the direction of drum rotation, the image bearing plate surface is transported through a development station C wherein the toner material is applied to the charged surface thereby rendering the latent electrostatic image visible. The now developed image is brought into contact with a sheet of final support material such as paper or the like, within a transfer station D wherein the toner image is electrostatically attracted from the photoconductive plate surface to the contacting side of the support sheet. Station E represents a mechanism for cleaning toner from the drum surface. U.S. Pat. No. 4,318,610 discloses further details of these xerographic functions and the contents of this reference are hereby incorporated by reference.

The optical system will now be described with further detail and with additional reference to FIGS. 2 and 3. In the base mode of operation the copier is operated to faithfully produce a copy of a document 18 which is placed image side down upon a horizontal transport viewing platen 20. This is accomplished by the full-rate mirror 22 moving in a parallel path beneath platen 20 and scanning the entire original document. Positioned on the scanning carriage 24 with the full-rate mirror are the illuminating lamp 26 and associated reflector 28. As the full-rate mirror scans the original document on the platen 20, the half-rate mirror 30, mounted on carriage 32 moves at one half the rate of the full-rate mirror to maintain the object-to-lens conjugate equal to the lens-to-image conjugate of the system. Typically the length of the scan of the full-rate mirror is the length of a normal letter size document.

In the reduction mode of operation the lens 34 is translated to a different position shown in phantom in FIG. 1 to alter the object conjugate/image conjugate relationship. In this operational mode the object to lens conjugate is larger than the lens to image conjugate, thereby providing an image of reduced magnification on the imaging surface.

Both the full-rate mirror carriage 24, which also contains the illuminating lamp 26 and the reflector 28, and the half-rate mirror carriage 32 ride on optical guide rails 36, 38 and are driven through the optics drive shaft 40 which is driven from a main drive belt from the machine main drive motor (not shown). The carriages are driven on both sides of the optics shaft 40 by means of drive pulley 44 and cable 42. The cable 42 is coiled around pulley 44 and is wrapped around optics idler wheels 46. With the arrangement shown in FIG. 2 the cable is wrapped around idler wheel 48 which is fixed to, and transports, the half-rate carriage such that for each unit of movement of the full-rate carriage the half-rate carriage moves one half the unit distance. In this manner the total object conjugate is maintained constant.

Figure 3:
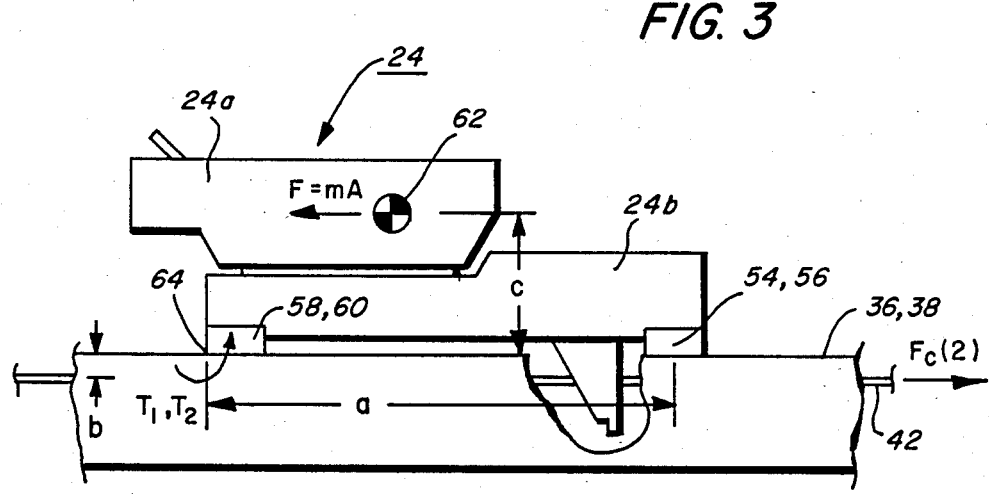
FIG. 3 is an enlarged side view of the full rate scan carriage shown in FIG. 2.

Referring now to FIGS. 2 and 3, and according to one aspect of the invention, the full-rate carriage 24 comprises an upper module 24A which houses the lamp 26 and associated reflector 28 and a base module 24B which houses mirror 22. The front portion of module 24B has a pair of magnetic members 54, 56 affixed to the bottom thereto and in sliding contact with the top surface of guide rails 36, 38, respectively. Similarly, rear magnets 58, 60 are affixed to the rear portion of module 24B. Members 54, 56, 58, 60 can be a ceramic or powdered metal magnet of a type commercially available. Rails 36, 38, preferably are of steel construction with a thin polyethelyne tape formed on the top surface thereof but the rails may be constructed of any material containing sufficient ferrous material so as to be acted upon by the magnets. Magnets 54–60 cooperate with rails 36, 38 to provide an attractive force to maintain carriage 24 in intimate sliding contact with the guide rails during the scan and rescan motion. More specifically, the magnets serve to create a force neutralizing the torque created by the accelerating carriage motion during scan which would tend to lift the front of carriage 24 from contact with the track. The reason for this torque effect is described in connection with FIG. 3.

FIG. 3 is an enlarged scale view of the full-rate scanning carriage of FIG. 2. At the initiation of a copying cycle and shown in FIG. 2, carriage 24 is in its home (start-of-scan) position. Shaft 40 is caused to rotate in the direction indicated in timed relation with drum 12. The motion of shaft 40 is translated to pulley 44, and thence to cable 42 creating a force $F_c$ at each cable urging carriage 24 forward to begin its scanning run.

As carriage 24 is accelerated up to speed, an inertial force F in an opposing direction to force $F_c$ is present at the carriage center of mass 62 (FIG. 3). Force F is seen to lie in a plane parallel to the plane/guide rails 36, 38 and separated from the rails by a distance c. Force F is also parallel to the plane of cables 42. The cable plane is separated from the carriage plane by distance b.

When a critical acceleration is exceeded, two force couples T1 and T2, produced by forces F and $F_c$, tend to cause the carriage to pivot in a counterclockwise direction about pivot point 64 at the rear of the carriage. These two force couples are defined as $$T_1 = (MA)(c) \tag{1}$$

where M is the mass of carriage 24, and A is carriage acceleration.

$$T_2 = 2F_c b \text{(for two cables)} \tag{2}$$

The force $F_m$ to be overcome by the action of magnets 54, 56 so as to maintain the front of the carriage in contact with the guide rails is therefore given by the expression $$F_m = (T_1 + 2T_2)/a \tag{3}$$

where a is the distance from the pivot point to the center of magnets 54, 56. Magnets 58, 60 may have the same field as magnets 54, 56.

It will be appreciated that the described device may be modified within purview of the principles of the invention. For example, although four magnets have been used to provide the required magnetic field, a lesser number may be sufficient for certain scan systems. Also, other materials may be used, such as Teflon, as a coating on the top surface of the guide rails. The following claims are intended to cover all such modifications.

What we claim is:

1. An optical scanning system in which an original document on a transparent document support is incrementally scanned by a plurality of movable optical components located beneath said support and a flowing light image of said document is projected upon a photosensitive member, said system including:

a pair of ferrous-containing guide members mounted parallel to each other and in a plane parallel to and beneath said document support, the top surface of said guide members being coated with a polyethylene material, a scanning carriage adapted for sliding contact along said guide members by means of at least a first and second magnet, each magnet in contact with a respective guide member, whereby, during carriage motion, said magnets create an attractive magnetic field between said carriage and said guide member so as to maintain a uniform sliding contact between carriage and guide member.

* * * * *